(12) United States Patent
Renner

(10) Patent No.: US 8,132,146 B2
(45) Date of Patent: Mar. 6, 2012

(54) INPUT OF PROGRAM INSTRUCTIONS IN IMPERATIVE PROGRAMMING LANGUAGES

(76) Inventor: Peter Renner, Kurten (DE)

( * ) Notice: Subject to any disclaimer, the term of this patent is extended or adjusted under 35 U.S.C. 154(b) by 1098 days.

(21) Appl. No.: 11/934,294

(22) Filed: Nov. 2, 2007

(65) Prior Publication Data

US 2008/0092126 A1 Apr. 17, 2008

Related U.S. Application Data

(62) Division of application No. 11/158,268, filed on Jun. 21, 2005, now Pat. No. 7,685,564.

(51) Int. Cl.
*G06F 9/44* (2006.01)
(52) U.S. Cl. ........ 717/105; 717/106; 717/109; 717/110; 717/113
(58) Field of Classification Search .................. None
See application file for complete search history.

(56) References Cited

U.S. PATENT DOCUMENTS 6,243,858 B1 * 6/2001 Mizoguchi et al. ............ 717/107

FOREIGN PATENT DOCUMENTS

EP 0 893 757 A2 1/1999

OTHER PUBLICATIONS

Implementing and Testing new Programming Constructs in a Data Flow VL Ghittori et al. 1998, online Pavia—Italy.
The Khoros Software Development Environment for Image and Signal Processing Konstantinides et al. May 1, 1994, IEEE Inc., New York—US.
Graphical Development Tools for Network-Based Concurrent Supercomputing Beguelin et al. Nov. 18, 1991, IEEE, Inc., New York—US.
Labview: Laboratory Virtual Instrument Engineering Workbench Sep. 1986, Byte, McGraw-Hill, Inc., St. Peterborough, US.
Influence of Visual Technology on the Evolution of Language Environments Oct. 1, 1989, Computer, IEEE Computer Society, Long Beach, CA—US.

* cited by examiner

*Primary Examiner* — Chuck Kendall
(74) *Attorney, Agent, or Firm* — John B. Hardaway, III; Nexen Pruet, LLC

(57) ABSTRACT

The invention relates to a programming surface for imperative, procedural languages. A further prerequisite is a graphical user interface (GUI). The programming surface for the input of program code can be used with known programming languages such as Visual Basic, Java, C++. In the case of the programming surface, there is no longer a need to key in the program instructions. A language syntax need not be observed. An instruction set need not be learned.

2 Claims, 6 Drawing Sheets

```
TEST JUNE 5, 2004 - APPLICATION1 - SCRIPT - SWITCH

EVENT:   SWITCH
QUERY:   IF VISUOBJECT SWITCH STATUS = ON THEN
ACTION:  SET VISUOBJECT PICTURE1 STATUS = ON
QUERY END

QUERY:   IF VISUOBJECT SWITCH STATUS = OFF THEN
ACTION:  SET VISUOBJECT PICTURE1 STATUS = OFF
QUERY END

PROCEDURE END
```

```
                TEST JUNE 5, 2004 - APPLICATION1 - SCRIPT - SWITCH

24      EVENT:   SWITCH
        25 ---- QUERY:   IF VISUOBJECT SWITCH STATUS = ON THEN
        26 ---- ACTION:  SET VISUOBJECT PICTURE1 STATUS = ON
        27 ---- QUERY END

28 ---- QUERY:   IF VISUOBJECT SWITCH STATUS = OFF THEN
        29 ---- ACTION:  SET VISUOBJECT PICTURE1 STATUS = OFF
        30 ---- QUERY END
        31 ---- PROCEDURE END
```

FIG. 5C

INPUT OF PROGRAM INSTRUCTIONS IN IMPERATIVE PROGRAMMING LANGUAGES

This application is a division of applicant's U.S. patent application Ser. No. 11/158,268 filed Jun. 21, 2005 now U.S. Pat. No. 7,685,564 for a Program System.

BACKGROUND OF THE INVENTION

In conventional programming languages, the lines of the program must be keyed in. This is in itself a tiresome operation. What is more, a formalism (syntax) is necessary so that the system can correctly interpret the program text input. Finally, a programmer must learn and master the instruction set associated with the relevant language in order to be able to create efficient programs.

SUMMARY OF THE INVENTION

The invention relates to a computer-aided method for creating program code. The invention has to do with imperative languages. In this kind of language, the program instructions are processed in sequence. It further has to do with procedural languages. In procedural languages, the instructions are encapsulated in blocks (procedures) in order to prevent undesired side interactions between blocks of instructions. Further, the invention makes use of graphical user interfaces (GUIs). These permit user interaction (man-machine interface) and are also known as operational and observational interfaces.

In procedural languages, as is the case in one widespread language (Visual Basic), the instructions of a procedure can be encapsulated in a starting line and an ending line specified by the system, these lines being generated automatically by the system. This can be done for example by an event (for example a user input) taking place in a graphical object of a visualization surface so that the framework of the procedure, comprising a starting line and an ending line, is generated automatically. The method according to the invention can be employed as a programming surface for inputting program code even in known programming languages such as Visual Basic, Java, C++. Program instructions no longer have to be keyed in, a language syntax no longer has to be observed, and an instruction set no longer has to be learned.

In accordance with the invention a program instruction containing at least one keyword is inserted and upon the choice of a keyword in an inserted program instruction, there is displayed a menu containing program text sections free of syntax errors with which the keyword can be replaced, and the operation of replacing keywords in an inserted program instruction is continued until all keywords have been replaced by executable program instruction sections. At this point it is desirable that the selected program instruction contain at least one so-called keyword. Such a keyword serves as a placeholder for at least one further keyword and/or at least one program instruction section. These keywords are to be viewed as incomplete parts of an instruction (raw instruction). They are substitutable by further keywords, instruction, variables, objects, properties of objects, arithmetic signs, logical operators, formulas and the like. It is necessary for these keywords to be replaced by executable program text in the course of the method according to the invention. Only when all keywords in the raw instruction have been replaced by executable program text is the instruction completed.

According to the invention, a particularly advantageous method based on menus is carried out for this replacement of keywords, such a menu being associated with each keyword in the system according to the invention. Such a menu exhibits a plurality of replacement texts with which the keyword can be replaced, such a replacement text containing in particular a processable program text such as the keyword stated above or also a further keyword. According to the invention in terms of method, when such a keyword is chosen in the inserted raw instruction, the associated menu is displayed, from which the user selects a suitable item. This operation of replacing keywords in an inserted virtual program instruction can advantageously be continued until all keywords have been replaced by an executable program instruction section. This method for creating program code according to the invention enables everyone to generate a computer program with computer aid, without special prior training, because the contents of the individual entries of the relevant menu are formulated in such a way that they generate program code free of syntax errors when they replace the keyword.

In development of the invention, provision is made that only two program instruction categories are provided for selection when a program instruction is inserted, in particular the instruction categories query and action. This in turn simplifies the computer-aided prompting of the user in creating program code. In the end all the user has to do is decide whether, for the corresponding program instruction, an item of information is required (query) or a command is to be executed (action). It is understood in turn that the nomenclature of the instruction categories "query" and "action," respectively, is interchangeable with any other nomenclature. In any case, however, one category involves the retrieval of an item of information and the other program instruction category involves the execution of a command. Moreover, it is also possible to insert so-called informational lines or comments, which, however, are irrelevant to the program execution sequence.

It is desirable if states such as operator actions, input parameters, database queries and states of external devices and sensor values are ascertained with the query instruction. It can be queried for example whether a temperature has exceeded a specified value, whether a vessel has been filled, a machine turned on or a key pressed. Ultimately, any state or value can be ascertained with the query instruction. It is desirable if the query instruction exhibits the basic structure "if (logical operation) then," similar query instructions such as "if not (logical operation) then," "if-then," "if (logical operation) then repeat" also being possible.

An action instruction, that is, a command, advantageously enables any operation, in particular a process control action, a presentation of information for the operating personnel, the storage of data (documentation), mathematical operations (such as the computation of formulas), programming operations such as for example loops, calls, etc.

As an individual skilled in the art is aware, a query instruction with "if (logical operation) then" implies action instructions. The stated action takes place only if a logical 1, that is, true, is returned in response to the query. In any case, the user of the system according to the invention has only the opportunity to select either an action instruction or a query instruction in order to insert program instructions into a procedure. If the user wishes to append a new program instruction, the instruction categories query and action are automatically displayed in a menu. The appropriate program instruction is inserted by selecting one of these two categories. It is desirable here if the inserted instruction is inserted in the form of a raw instruction, which does not yet represent a complete instruction, this raw instruction being supplemented through further steps into a complete instruction executable by the system. It can be desirable if certain parts of the raw instruction are replaced over a plurality of selection operations, so that in the end the executable program instruction is produced in particular in a specified high-level language. What is essential is that the user receive "forced prompting" by the system according to the invention, so that syntax errors are ultimately ruled out. Preferably the keywords in the virtual program instruction are clearly emphasized, for example by underscoring or color-coding. It is particularly desirable that the menus also contain program instructions such as assignments, loops or calls, so that ultimately the entire programming tool can be furnished to the user in computer-aided, context-dependent fashion. The invention makes it unnecessary for the user to learn a programming language in order to create program code that is executable on a computer.

In the method according to the invention and the system according to the invention, respectively, error messages such as are required in the prior art can be dispensed with in the creation of program code or its compilation. In contrast, however, it can be advantageous if an error message is displayed in situations where an attempt is made to execute the program code even though at least one of the keywords in one of the program sections of a program component has not yet been replaced as described. Objects created by the user, in particular visualization objects, parameter objects, variables, program components created in the structural diagram, etc., are automatically included in the respective menus along with their individual identifiers. In this way it is ensured that all possible program text sections with which a keyword can be replaced are also displayed in the relevant menu. Because program commands such as assignments, loops, calls can also be contained in the menus, the length of the menus depends on the power of the language used and the number of objects created by the user.

Particularly in the case of graphical objects, it can furthermore be desirable to establish what properties of objects are included in the menus, provided this is possible in the system according to the invention. In this way the length of certain menus containing object properties can be limited. Such properties can concern the appearance of the graphical objects. Moreover, however, it can also be advantageous to provide an expert mode in which menus are presented permitting access to all properties by the program being created. In the normal mode, in contrast, access is provided to the important properties through prior setting. The user can modify these prior settings in the system according to the invention and thus adapt them to his individual wishes and capabilities. As an individual skilled in the art is aware, the system for the computer-aided creation of program code according to the invention can be provided through a run-time environment comprising an input means such as a keyboard and/or mouse, a presentation means such as a monitor and a data-processing means such as a processor apparatus as well as a storage means into which software code can be loaded with which a method according to the invention is executable. A conventional PC is quite adequate as hardware for the performance of the method according to the invention.

The herein disclosed invention encompasses:
A. Computer-aided generation of program instructions belonging to only two categories (query/action), so that a computer-aided method is provided that facilitates the conversion of the programming task to program code, and
B. A special computer-aided method for creating program instructions without the need for the user to key in the relevant program code.

BRIEF DESCRIPTION OF THE DRAWINGS

In what follows, the invention is described through the description of an embodiment with reference to the appended Drawings, in which:

FIG. 5c depicts the program code generated in accordance with the invention for displaying the pictures "Picture A" and "Picture B"

DETAILED DESCRIPTION OF THE INVENTION

Figure 1:
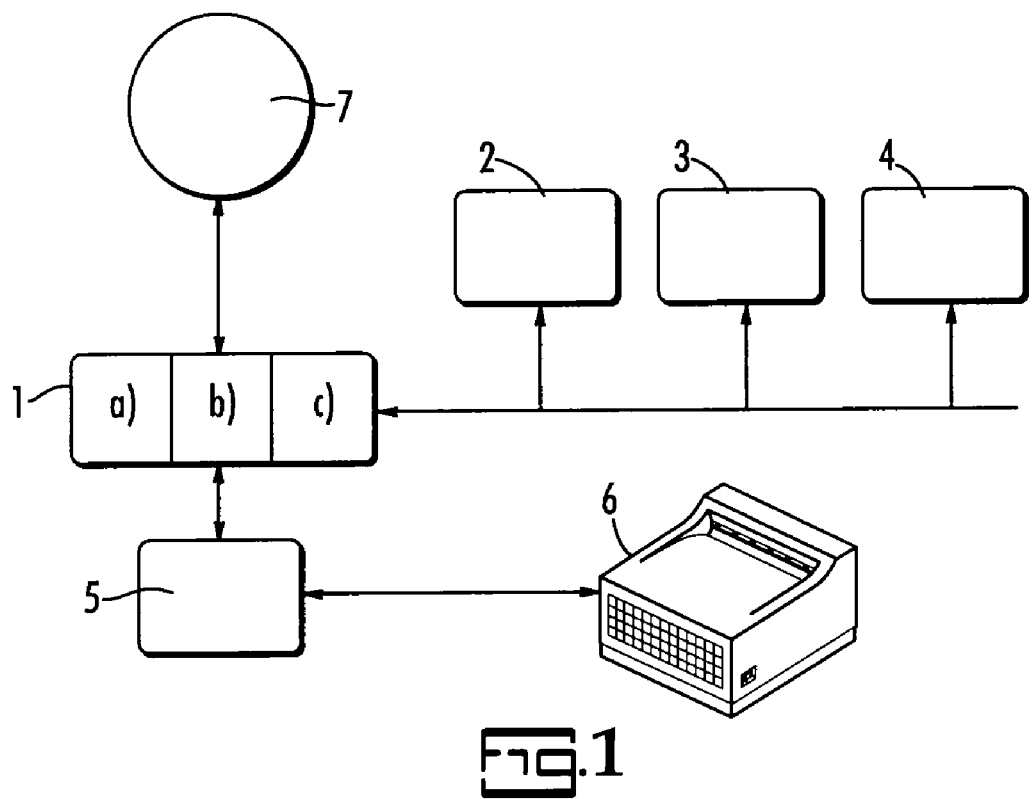
FIG. 1 depicts a schematic structure as a flowchart of a programming system according to the invention.

FIG. 1 is a schematic of a system according to the invention having a run-time environment for the computer-aided creation and processing of program code. The environment comprises a PC 1, which has a data-processing means 1a in the form of a CPU, storage means 1b for storing software code for the performance of the method according to the invention, for storing a database during the performance of the method and for storing the program code created with computer aid, and input means 1c in the form of a keyboard and mouse. PC 1 is further connected to displays in the form of screens 2, 3, 4, on which a visualization diagram, a parameter diagram and a structural diagram, respectively, are presented. Furthermore, PC 1 has an external port 7 with which the system can communicate outwardly. The computer is further connected to a printer 6 via a port 5.

Parameter diagram or screen 2 serves to display parameters input via keyboard 1c. Data influencing the subsequent program sequence can be input in this way. Data for a later run can also be given in this way as a created program is running. Parameter files can thus be provided for later program runs. Visualization diagram 3 serves on the one hand for creating objects during program creation and further for observing the objects as the created program code is running. Structural diagram 4 serves essentially for structuring the programming task while creating program code. As the created program code runs, highlighting of program components or their symbols in run-time mode makes it possible to indicate what program components or program component is currently being processed.

During run time, the user has access to the created program code, which is also stored in memory 1b. In development mode, this code can also be edited via screens 2, 3. Printer port 5 also contains a configuration of the data output as forms, which are output by printer 6. In the embodiment depicted, the system exhibits an external port for connection to sensors with which measurements can be acquired. What is more, control signals that control external operations can be output via this port.

Using the system identified in FIG. 1, the user can perform a computer-aided selection in structural diagram 4 of various types of program components, which are then displayed in the structural diagram. These program components are represented as symbols and can be dragged onto the surface and disposed in the structural diagram. They are then automatically linked by the system with lines according to specified rules so as to establish the framework of the program to be created. Finally, any program can be generated with this computer-aided disposition of program components. Selecting the relevant component or symbol gives access to the program code section of the component.

Figure 2:
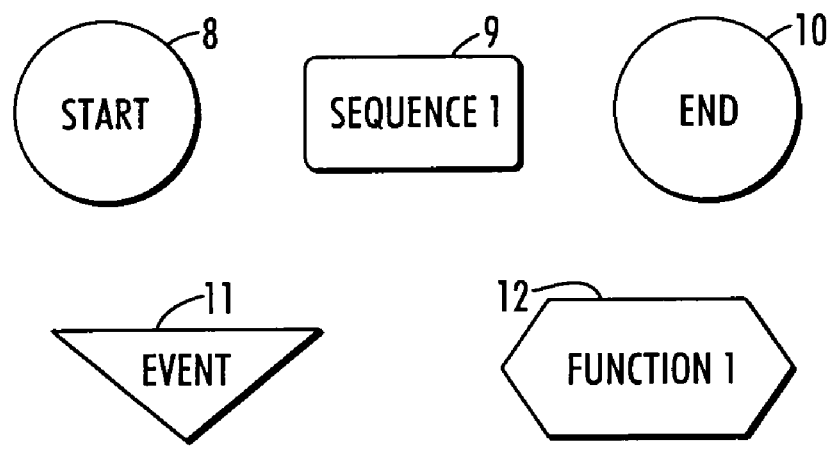
FIG. 2 depicts program component symbols of a structural diagram.

FIG. 2 depicts a plurality of symbols as used in a structural diagram, each of which represents a program component. The sequence component category comprises the types: sequence component 9, event component 11, start component 8 and end component 10. Sequences are serially linked by the system so that their mode of operation is chronological. Thus only one component of the sequence category can be active at any given time. Sequences permit conditional branches. Also depicted in FIG. 2 is a function component type or its symbol 12, which belongs to the function component category. Functions allow tasks to be performed simultaneously, that is, in parallel with sequences. Program components can be linked according to specified rules in the programming system according to the invention. Start component 8, for example, calls another component type of the sequence category other than event component 11. This can be a sequence component 9 or an end component 10. Moreover, start component 8 can also call a function component 12. Event component 11 is called by events that can occur in the course of the program and can in turn call a sequence component 9, an end component 10 or a function component 12. The start of a sequence can therefore be due to a start component 8 or an event component 11. An event that initiates the start of a sequence can be for example the choosing of an operating object in a visualization diagram. The linking rules implemented further establish that sequence component 9 is called either by a start component 8, an event component 11 or a sequence component 9 and can in turn call a sequence component 9, an end component 10 or a function component 12. Moreover, conditional branches are possible in sequences. The linking rules of the embodiment being described say further that end component 10 forms the termination of a sequence. It is called either by a start component 8, an event component 11 or a sequence component 9. It can in turn call a function component 12. This function component 12 operates in parallel with sequences. It is called either by a start component 8, an event component 11, a sequence component 9 or an end component 10. Function component 12 itself cannot call any program component. The system offers the user only the cited program components, which can be divided into sequence and function categories, for selection. These selected program components are then indicated as in FIG. 2 by associated symbols, which under some circumstances can be provided by the user with an identifier such as a name.

Figure 3:
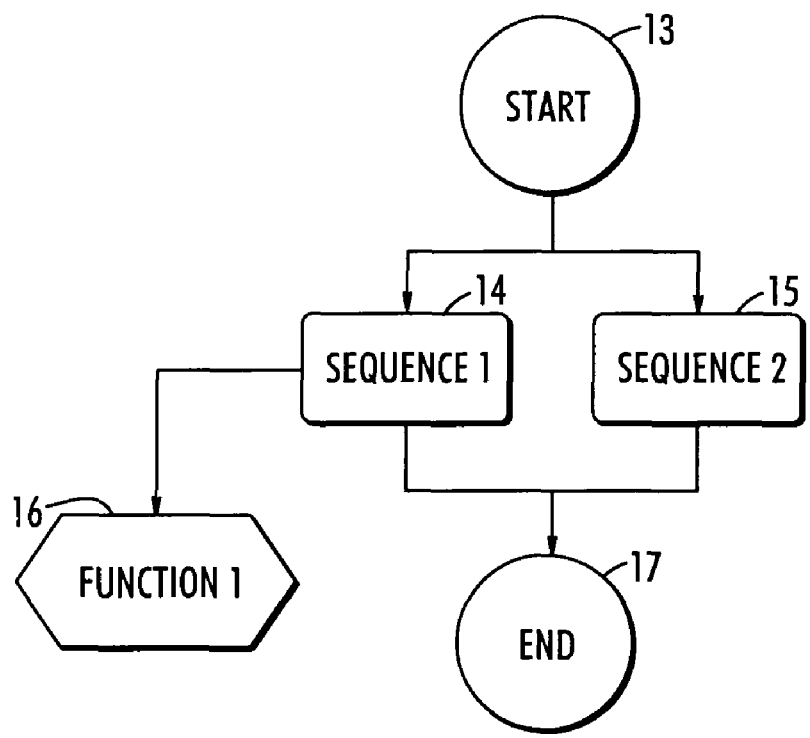
FIG. 3 depicts exemplary symbols each representing a sequence diagram.

FIG. 3 depicts a structural diagram in which the system has automatically linked the program components together with lines so that the program progression and the program structure are made clear. Whenever a further symbol representing a program component is created in the structural diagram by the user, this symbol is automatically disposed and linked to the calling symbol, in dependence on the type of the new component, by the system according to the invention. Symbols 13 to 17 serve to represent associated program components. According to the rules stated above for linking program components, symbols 13 to 17 are disposed and automatically linked with lines by the system so as to reflect the program sequence and the program structure. The arrows in the linking lines between symbols make the program sequence clear. The program structure is furthermore represented by the basically vertical disposition of serially linked sequence components 13, 14, 15 and 17, while function component 16, operating in parallel, is disposed horizontally with respect to the calling sequence component Sequence1. The linking lines to function component 16 show a basically horizontal alignment, a vertical offset being necessary because of the disposition of the symbols. The linking lines between start component 13 and both sequence components 14, 15 exhibit a basically vertical alignment, a horizontal offset being necessary because of the disposition of the symbols. The symbols of the structural diagram in FIG. 3 serve as a virtual container for the relevant program code section. The program code section is accessed by clicking on the symbols. A window thereupon opens in which the program code section can be edited. In the embodiment described, the system according to the invention furnishes a development mode and a run-time mode, the created program code being processed in the latter. Upon the start of the program, as illustrated in FIG. 3, the first program code section processed is that associated with start component symbol 13. Start component 13 can call either the sequence component "Sequence1" 14 or the sequence component "Sequence2" 15. For this purpose, a conditional branch is provided in the program code section of start component 13, ensuring that either sequence component 14 or sequence component 15 is called.

As illustrated in FIG. 3, sequence component 14 conditionally or unconditionally calls function component 16. Its program code section is processed in parallel with the sequence comprising program components 13, (14; 15) and 17. Function component 16 differs from the subprocedures known in conventional programming languages. Such subprocedures interrupt the program sequence. In contrast, function component 16 is processed in parallel with the calling program part and thus represents a novel element. This function component can advantageously be used in the case of time-consuming operations, which can then run in parallel. Depending on the application, the calling program component can exchange data with the called program component. Each of sequence components 14, 15 calls end component 17 unconditionally. Here there is no conditional test because the program progression goes via either sequence component 14 or sequence component 15. Parts of the program that must be executed before the termination of the program can be stored in end component 17. In a particular embodiment, results are stored and printouts generated in the end component, as illustrated in FIG. 1.

Figure 4:
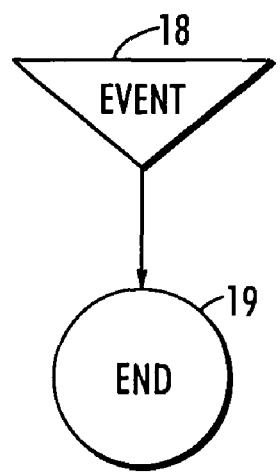
FIG. 4 depicts an example of a sequence that is started by an event component.

FIG. 4 depicts a structural diagram having an event component 18 that is terminated by an end component 19. Event component 18 is called by events that can occur in the course of the program and can in turn call a sequence component, an end component or a function component. Such events can be for example operator actions that are initiated by clicking on visualization objects in visualization diagrams. Such events can occur at any time during the run time of the program created. Event component 18 starts a sequence that differs from a sequence of FIG. 3 only in the way it is started. While a sequence illustrated in FIG. 3 can occur only once in an application, sequences according to FIG. 4, which are executed in parallel fashion, can occur in any number. These sequences according to FIG. 4, which are started by event module 18, operate independently of one another and also independently of a sequence according to FIG. 3, which is started by a start component 13. This also makes clear the difference from function component 16. The latter, while it does operate in parallel with a sequence, is however called by a program component of the sequence type via a data channel and is thus associated with this sequence. As illustrated in FIG. 4, event component 18 is serially linked with end component 19, this link in turn being generated automatically by the system. Any program code section can be placed in both components for execution when the event initiating the sequence occurs.

Figure 5A:
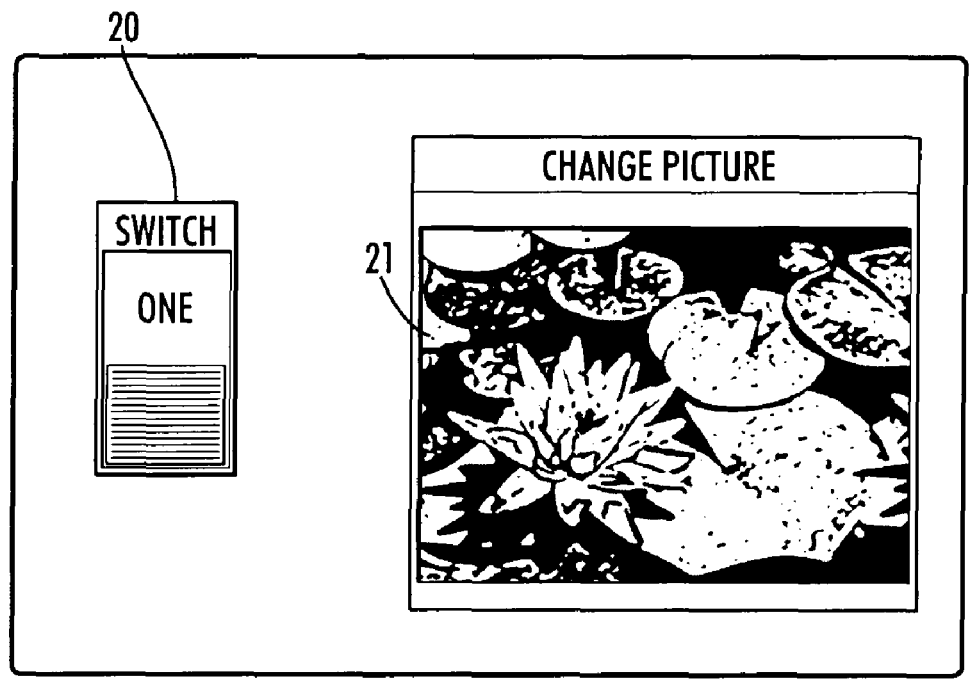
FIG. 5a is a portion of a visualization diagram with the output "Picture A"
Figure 5B:
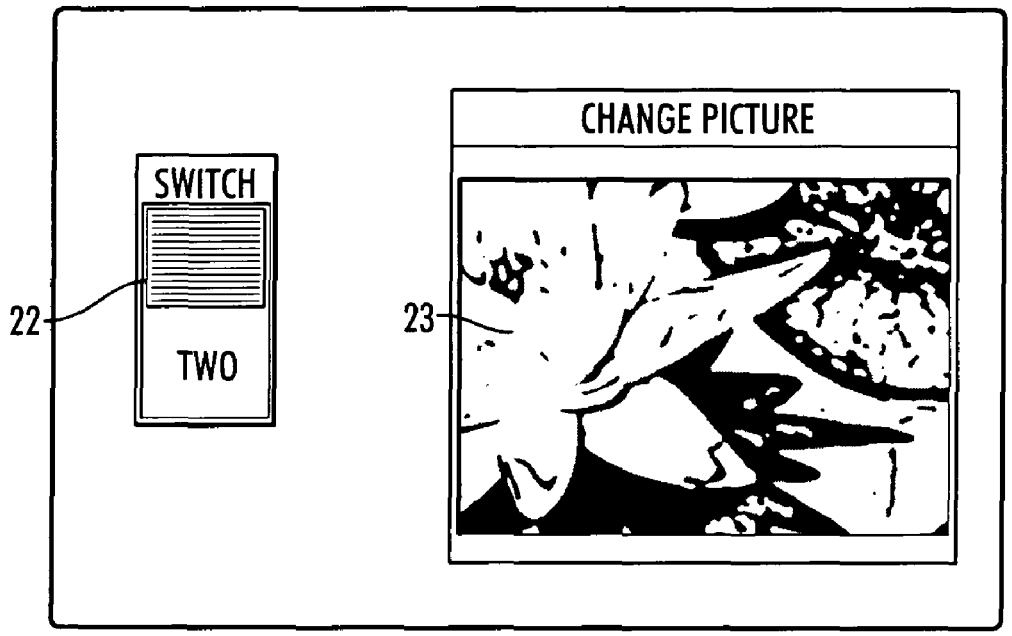
FIG. 5b is the same portion of the visualization diagram with the output "Picture B"

FIGS. 5a through 5c illustrate the creation of objects and the corresponding program code section of an event component in which the generated objects are employed. An event procedure is called every time an event occurs, for example through an operator action via a graphical object of the graphical user interface (GUI). Reference is made first to FIG. 5a, which depicts a visualization screen having a switch object 20 and the individual name "Switch" in one switch position "One." Further illustrated is a picture object 21 with the individual name "Change-Picture" from the output of one of two pictures. Such a visualization diagram serves for operating and observing as the created program is processed. In contrast, FIG. 5c illustrates the program instructions that generate the desired program progression. FIGS. 5a and 5b illustrate the same visualization objects. In FIG. 5a, switch 20 with individual name "Switch" is in position "One," while in FIG. 5b the same switch 22 is in position "Two." Associated with each switch position is a picture object 21 or 23 respectively. In dependence on switch position 20, 22, either the picture corresponding to 21 or the picture corresponding to 23 appears. The picture object can thus represent two distinct pictures on the basis of its definition.

The task of the program sequence according to FIG. 5c is to change from one of the two positions "One" or "Two" into the other when switch 20, 22 is actuated, to replace the picture of picture object 21, 23 from "Picture A" 21 to "Picture B" 23 and vice versa. Accordingly, position "One" is assigned to picture 21 and position "Two" to picture 23. Every time switch 20, 22 is actuated, an event is initiated that calls the procedure of FIG. 5c, so that the instructions of procedure 5c are processed. Corresponding to this sequence in the structural diagram is an event program component as represented by symbol 18 in FIG. 4. FIG. 5c illustrates the program code section that corresponds to this event program component. In development mode, as already explained in the foregoing, the user can choose program component 18 and so open its program code section. The program code section that then opens is illustrated, after expansion, in FIG. 5c. When the sequence is created in the structural diagram, lines 24 and 31 are created automatically. These characterize the instruction type, "Event," and the name of the sequence, "Switch." The name of corresponding object 20, 22 on the visualization surface is automatically used by the system so that the user does not have to perform any further input here. Now, with computer aid, the user can append additional program instructions that are instructions of either the query category or the action category. The nature and manner of appending are discussed further in what follows. By definition, appended program instructions 25 to 30 are either query instructions or action instructions. Query instructions 25, 27 and 28, 30 respectively are so-called block instructions comprising two lines. As a rule they enclose further instructions, the block instructions and the instructions enclosed in the block instructions being logically related. The event component illustrated as its program instruction in FIG. 5c is linked to visualization object "Switch" 20, 22, the event being initiated when switch 20, 22 is thrown. This program progression is started by the user by actuating the switch in the visualization surface.

In particular, lines 25, 26 and 27 constitute an instruction block, line 25 being an "if-then" instruction. It means that action instruction 26 is executed if the switch is in position 21. This line then sets visualization object 21, 23 to "on" status, corresponding to picture 21. In this way, picture 21 is presented upon throwing the switch into the "on" position. Similarly, lines 28, 29 and 30 likewise constitute an instruction block, the "if-then" instruction in line 28 causing action instruction 29 to be executed when the switch is in position 22, that is, the "off" position. Action instruction 28 sets visualization object 21, 23 to the "off" status, which is assigned to picture 23. In this way, picture 23 is presented when the switch is in the "off" position. The program code cited, generated with the system according to the invention, causes the processing of the program code illustrated in FIG. 5c to be started every time the switch is reversed in the visualization diagram, so that visualization object 21, 23 changes the picture.

Figure 6A:
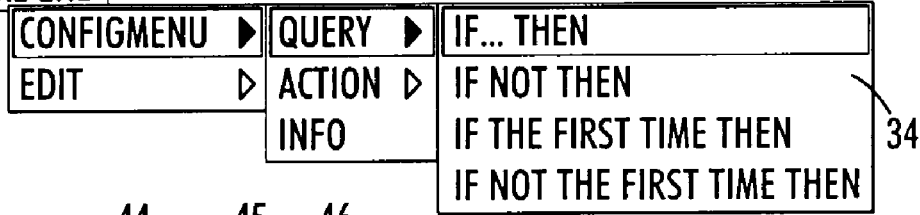
FIGS. 6a and 6b depict by way of example the creation of a query instruction without the necessity of keying in a program instruction.
Figure 6A:
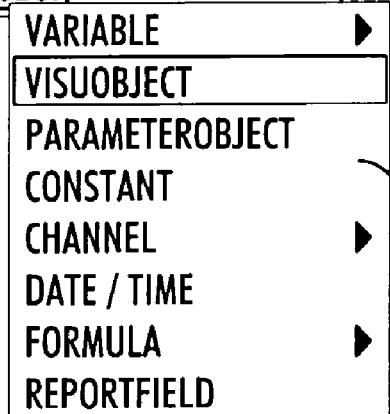
Figure 6B:
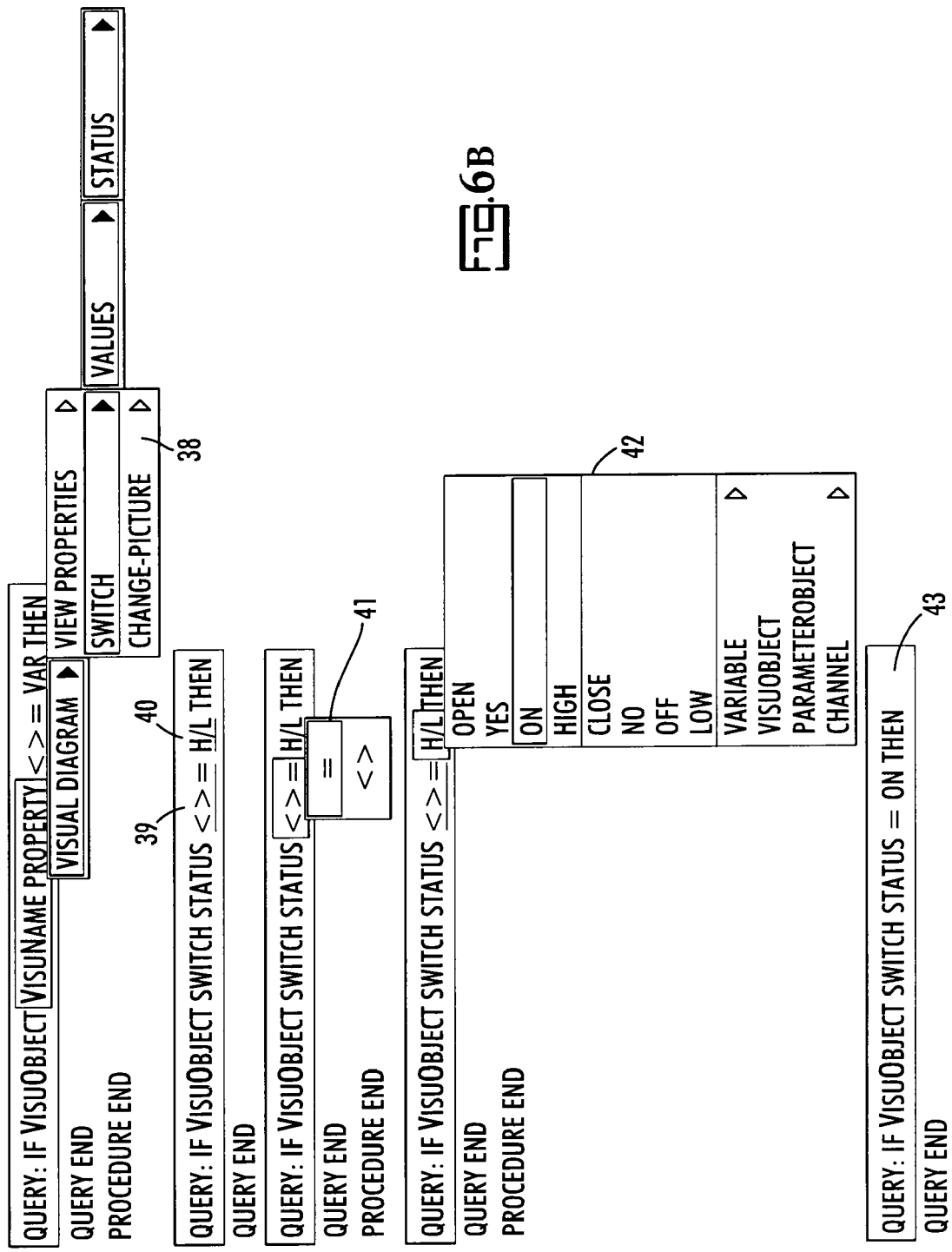

In what follows, the insertion of a program line into a program component according to the invention, with the aid of keywords and corresponding menus, is shown with reference to FIGS. 6a and 6b. In this way the user is enabled to generate program code without having to key in a single line himself. Each menu, depending on embodiment, contains further keywords, program instructions, variables, objects, properties of objects, arithmetic signs and/or logical operators. Lines 32 and 33 show the complete instruction whose creation is explained in what follows with reference to FIG. 6a. Accordingly, the goal is to generate an "if-then" instruction, that is, an "if-then" block instruction. This instruction expresses that action instructions that can be inserted between lines 32 and 33 are executed only if the result of the logical operation in the "if-then" block instruction is true. The first step in inserting a new instruction is connected with the display of a menu 34, which is fashioned as a context-sensitive menu. As will be seen, the system offers for insertion either a query or an action as the two possible categories of instructions. The query instruction has already been selected, so that menu 34 for the query instruction is automatically displayed. Now the user can use the mouse to select one of the query instructions displayed in menu 34 and confirm by clicking. As a reaction thereto, the system inserts new line 35, which can be designated as the raw form of an "if-then" instruction. Line 35 exhibits three keywords, which are identified by underscoring and must be replaced in order by executable program text, program text sections or further keywords. Thus the keyword "Object" in line 35 is selected first by the user, by clicking on it, whereupon menu 36 of the keyword "Object" opens. This menu 36 represents all possible program texts or program text sections or keywords with which the selected keyword "Object" can be replaced. The line "Visuobject" has already been selected in the menu, so that the objects of the visualization diagram depicted in FIGS. 5a and 5b can be accessed. As can be seen in the Figure, the keyword "Object" is replaced by "VisuObject Visuname Property" 37. This means that the keyword "Object" has been replaced by the text component comprising the object category "Visuobject" and the new keyword "Visuname Property." The next task is accordingly to replace new keyword 37, making it possible to access the properties of visualization objects 20, 21. By choosing and clicking on the keyword "Visuname Property" in line 37, associated menu 38 is opened; see FIG. 6b. The length of menu 38 depends on the number of visualization objects created and the number of properties of the individual visualization objects. As soon as a further visualization object is created in a visualization diagram, the system according to the invention automatically extends menu 38. The highlighted line "Switch/Status" of menu 38 has already been selected, as reflected in the instruction line therebelow, which does not yet constitute an executable instruction because it exhibits further keywords.

In the described embodiment of the system according to the invention, the user is free to define, for each visualization object, what properties of objects or of a certain object are to appear in the associated menus. Ultimately, the system according to the invention automatically generates associated menus for all objects occurring, as for example in parameter diagrams, visualization diagrams, print objects, variables, etc., so that the user does not himself have to perform any of these inputs with the exception stated above. Thus, in the example of FIGS. 6a, b, remaining keywords 39 and 40, constituting the logical operation of the query, must still be specified. When keyword 39 is chosen, its menu 41 opens. The logical operator "=" is chosen. As can be seen in the line therebelow, keyword 39 is thereupon replaced by the equals sign. Next, keyword H/L 40 is chosen, so that its menu 42 opens automatically. The terms "open; yes; on; high" in menu 42 constitute synonyms for a logical 1, while the term "close; no; off; low" constitute synonyms for a logical 0. The further entries in menu 42 are objects and object properties. In menu 42, "on" has already been selected, as reflected in the now complete and processable instruction line 43. This block instruction thus constitutes the complete result, generated with a few mouse clicks, within the programming system according to the invention. Any program can be generated in this way with computer aid by a user with no special knowledge.

LIST OF REFERENCE CHARACTERS

1 Computer
1a Data-processing means
1b Storage means
1c Input means
2 Parameter diagram
3 Visualization diagram
4 Structural diagram
5 Printer port
6 Printer
7 External port
8 Symbol for start component of sequence category
9 Symbol for sequence component of sequence category
10 Symbol for end component of sequence category
11 Symbol for event component of sequence category
12 Symbol for function component of function category
13 Symbol for start component of sequence category
14 Sequence component of sequence category
15 Sequence component of sequence category
16 Function component of function category
17 End component of sequence category
18 Symbol for an event component of sequence category
19 Symbol for an end component of sequence category
20 Switch object
21 Picture object
22 Switch object
23 Picture object
24 Script editor
31 Program lines of an event component
32 Program line
33 Block instruction
34 Menu
35 Raw form of a block instruction
36 Menu
37 Keyword
38 Menu
39 Keyword
40 Keyword
41 Menu
42 Menu
43 Program instruction

What is claimed is:

1. A computer-aided method for creating program code in imperative languages in which the software code can be encapsulated in procedures, having a graphical user interface, wherein a program instruction containing at least one keyword is inserted and wherein, upon the choosing of said keyword in an inserted program instruction, a menu is displayed containing program text sections free of syntax errors with which the keyword can be replaced, and wherein the operation of replacing keywords in an inserted program instruction is continued until all keywords have been replaced by an executable program instruction section, and wherein, when a program instructions is appended to the program code section of a program component, a program instruction from one of action and query program instruction categories is presented for selection by a menu, the program instruction in the form of a raw and structure being inserted as one of an action and a query instruction containing key words after one of these two categories has been selected.

2. A computer-aided method for creating program code in imperative languages in which the software code can be encapsulated in procedures, having a graphical user interface, wherein a not yet complete program instruction containing at least one keyword is inserted and wherein, upon the choosing of a keyword in an inserted program instruction, a menu is displayed containing program text sections free of syntax errors with which the keyword can be replaced, and wherein the operation of replacing keywords in an inserted program instruction is continued until all keywords are replaced by an executable program instruction section, and wherein, when a program instructions is appended to the program code section of a program component, a program instruction from one of action and query program instruction categories is presented for selection by a menu, the program instruction in the form of a raw and structure being inserted as one of an action and a query instruction containing key words after one of these two categories has been selected.

* * * * *